(12) United States Patent
Guillard et al.

(10) Patent No.: US 7,197,894 B2
(45) Date of Patent: Apr. 3, 2007

(54) INTEGRATED PROCESS AND AIR SEPARATION PROCESS

(75) Inventors: Alain Guillard, Paris (FR); Patrick Le Bot, Vincennes (FR); Bernard Saulnier, La Garenne Colombes (FR)

(73) Assignee: L'Air Liquide, Societe Anonyme A' Directorie et Conseil De Survelliance Pour L'Etude Et, L'Exploltation Des Procedes Georges, Claude, Paris (FR)

( * ) Notice: Subject to any disclaimer, the term of this patent is extended or adjusted under 35 U.S.C. 154(b) by 488 days.

(21) Appl. No.: 10/778,572

(22) Filed: Feb. 13, 2004

(65) Prior Publication Data

US 2005/0178153 A1    Aug. 18, 2005

(51) Int. Cl.
    *F25J 3/00*    (2006.01)
(52) U.S. Cl. .......................... 62/643; 62/646
(58) Field of Classification Search ............. 62/643, 62/646
    See application file for complete search history.

(56) References Cited

U.S. PATENT DOCUMENTS

| | | | | |
|---|---|---|---|---|
| 3,731,495 A | * | 5/1973 | Coveney | 62/651 |
| 4,382,366 A | * | 5/1983 | Gaumer | 62/646 |
| 4,557,735 A | * | 12/1985 | Pike | 95/99 |
| 5,329,776 A | | 7/1994 | Grenier | |
| 5,421,166 A | * | 6/1995 | Allam et al. | 62/649 |
| 5,666,823 A | * | 9/1997 | Smith et al. | 62/646 |
| 6,050,105 A | * | 4/2000 | Keenan | 62/643 |
| 6,202,442 B1 | * | 3/2001 | Brugerolle | 62/649 |
| 6,871,513 B2 | * | 3/2005 | Guillard | 62/648 |
| 2003/0136147 A1 | * | 7/2003 | Brugerolle et al. | 62/650 |

FOREIGN PATENT DOCUMENTS

| | | |
|---|---|---|
| EP | 0 504 029 B1 | 3/1992 |
| EP | 0 748 763 B1 | 6/1996 |

OTHER PUBLICATIONS

"Oxygen Facilities for Synthetic Fuel Projects", by W. J. Scharle et al., Journal of Engineering for Industry, Nov. 1981, vol. 103, pp. 409-417.

* cited by examiner

*Primary Examiner*—William C. Doerrler
(74) *Attorney, Agent, or Firm*—Elwood L. Haynes

(57) ABSTRACT

An integrated process and air separation process including the steps of: Work expanding at least one first pressurized gas 39 derived from a first process at a first site 1, using work generated by the expansion of the at least one pressurized gas to drive a first air compressor 5 at the first site and removing compressed air from the first air compressor, sending at least part of the compressed air 19 from the first air compressor to an air separation unit 21, located at a second site 2 remote by at least 1 km from the first site, separating at least part of the compressed air sent from the first site to the second site in the air separation unit and removing at least one fluid 37 enriched in a component of air from the air separation unit and sending at least part of the fluid enriched in a component of air to the first site.

13 Claims, 3 Drawing Sheets

INTEGRATED PROCESS AND AIR SEPARATION PROCESS

BACKGROUND OF THE INVENTION

1. Field of Invention

This invention relates to an integrated process and air separation process and an apparatus for carrying out the integrated process.

2. Related Art

Current natural gas reserves are often situated far from world markets. Although it is possible to transport the natural gas, in many cases it is preferred to convert the natural gas fields in situ into more readily transportable products such as synthetic fuels, methanol or dimethyl ether. The conversion processes generally consume very large amounts of oxygen and produce excess steam. Background for this field is to be found in "Oxygen Facilities for Synthetic Fuel Projects", by W. J. Scharle et al., Journal of Engineering for Industry, November 1981, Vol. 103, pp. 409–417, in "Fundamentals of Gas to Liquids" January 2003, The Petroleum Economist Ltd and in EP-A-0748763.

It is not always possible to construct an air separation unit close to the site of the conversion process, for example for environmental or economic reasons. In this case, the steam generated is sent via a pipeline to the air separation unit site and there it is expanded in a turbine coupled to the main compressor of the air separation unit.

However, the cost of such steam pipelines is prohibitive since the steam has to be maintained at a high temperature to prevent condensation.

In some cases, there may be a number of processes each producing excess energy in the form of steam or another hot gas. There may be insufficient energy available on the site of the process to justify exporting that energy and the steam or other hot gas may be vented to the atmosphere. Furthermore the individual processes may each produce a different grade of steam, such that the two grades of steam cannot be sent to a single steam turbine.

SUMMARY OF THE INVENTION

It is an object of the present invention to provide a process for separating air using the energy generated by a process remote from the air separation unit.

An integrated process and air separation process comprising expanding at least one first pressurized gas derived from a first process at a first site, using work generated by the expansion of the at least one pressurized gas to drive a first air compressor at the first site and removing compressed air from the first air compressor, sending at least part of the compressed air from the first air compressor to an air separation unit, located at a remote second site separating at least part of the compressed air sent from the first site to the second site in the air separation unit and removing at least one fluid enriched in a component of air from the air separation unit and sending at least part of the fluid enriched in a component of air to the first site.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIGS. 1, 2, and 3 show combined installations according to the invention. The figures are not to scale.

DESCRIPTION OF PREFERRED EMBODIMENTS

The term "partly pressurized" implies that the oxygen or nitrogen streams may for example be pumped to a pressure less than their required pressure and then vaporised at the second site before entering the pipelines. Compressors at the first site subsequently compress the nitrogen and oxygen to their required final pressures, if needed.

Figure 1:
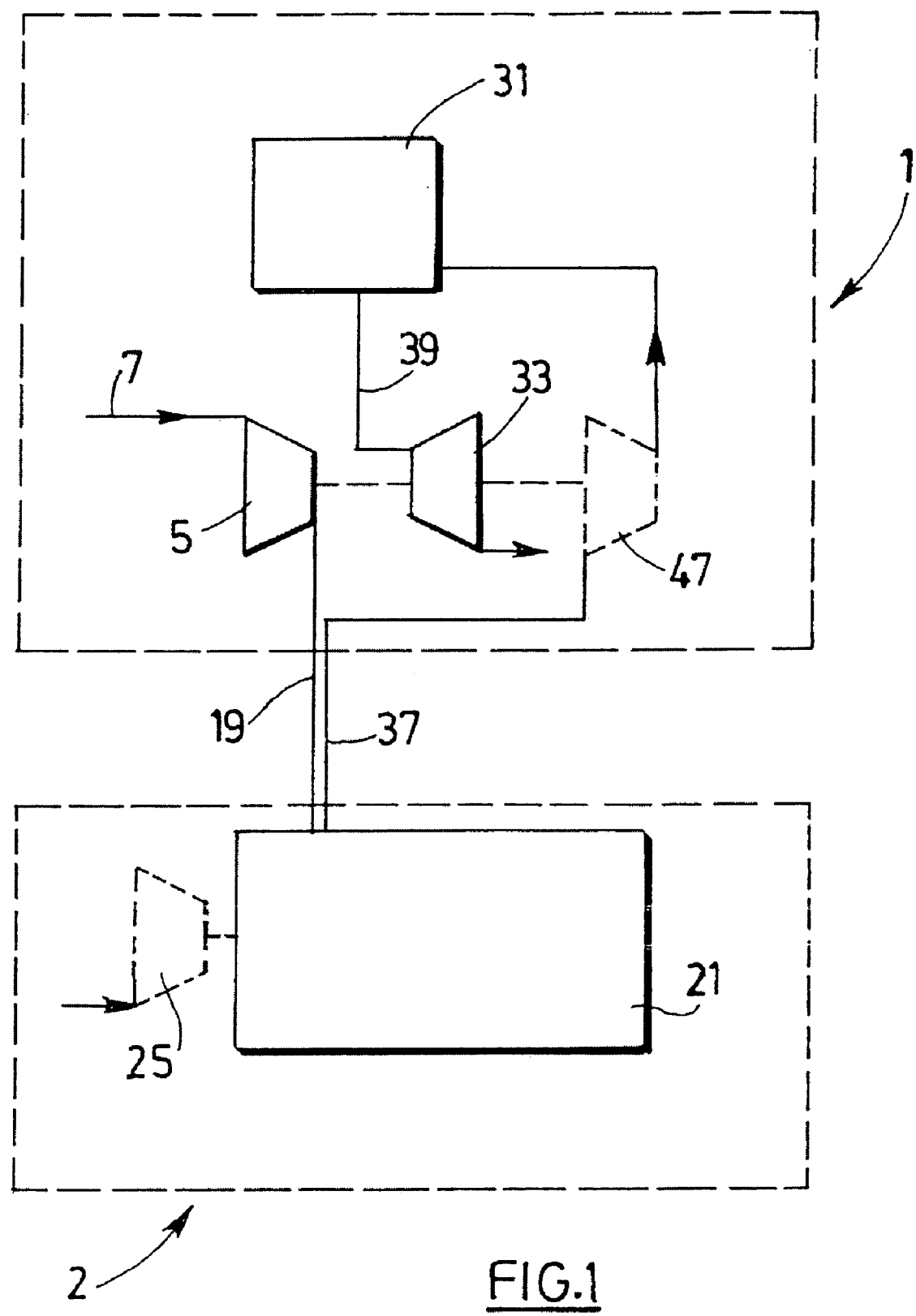
FIG. 1 illustrates an integrated process and air separation unit.

FIG. 1 shows an integrated process and air separation unit.

The integrated process unit 31 is located at a first site 1 and may for example be a GTL unit, for example comprising a Fischer Tropsch unit, a methanol production unit, a DME production unit, a fuel combustion unit such as a gas turbine or any unit producing directly or indirectly steam or another hot gas.

The term "process unit" implies that a process takes place at some location and at some time within the unit. However the unit itself does not necessarily operate according to a process, which is globally exothermic.

The steam or other hot gas 39 is expanded in a turbine 33 (which may form part of process unit 31) located at the first site 1 and work from the turbine is transferred via coupling to an air compressor 5. In this example, the air compressor 5 compresses only air 7 to be sent to the air separation unit 21. The compressed air 19 is compressed to a pressure above 8 bars, preferably above 12 bars and is sent to the air separation unit 21 at a second site 2 at least 1 km away. It is nevertheless conceivable that compressed air from the air compressor 5 could also be sent elsewhere, for example to another air separation unit.

Compressed air may also be sent to the air separation unit 21 from an air compressor 25 located at the second site 2.

Air to be separated in the air separation unit 21 is purified in a purification unit at the second site and all the air streams sent to the air separation unit 21 at the second site from the purification unit at the second site are at pressures less than 50 bars.

A product gas 37 (which may be replaced by a product liquid) coming from the air separation unit is also sent to another pipeline running at least substantially parallel to the air pipeline over at least part of its length, thereby saving civil engineering costs. This gas, which may be nitrogen, oxygen or argon, is unpressurized, partly pressurized or pressurized. Where the gas is unpressurized or partly pressurized, it may be compressed in a compressor 47 coupled to the turbine 33 at the first site. The gas may then be used at the first site and may for example be used in the process.

Figure 2:
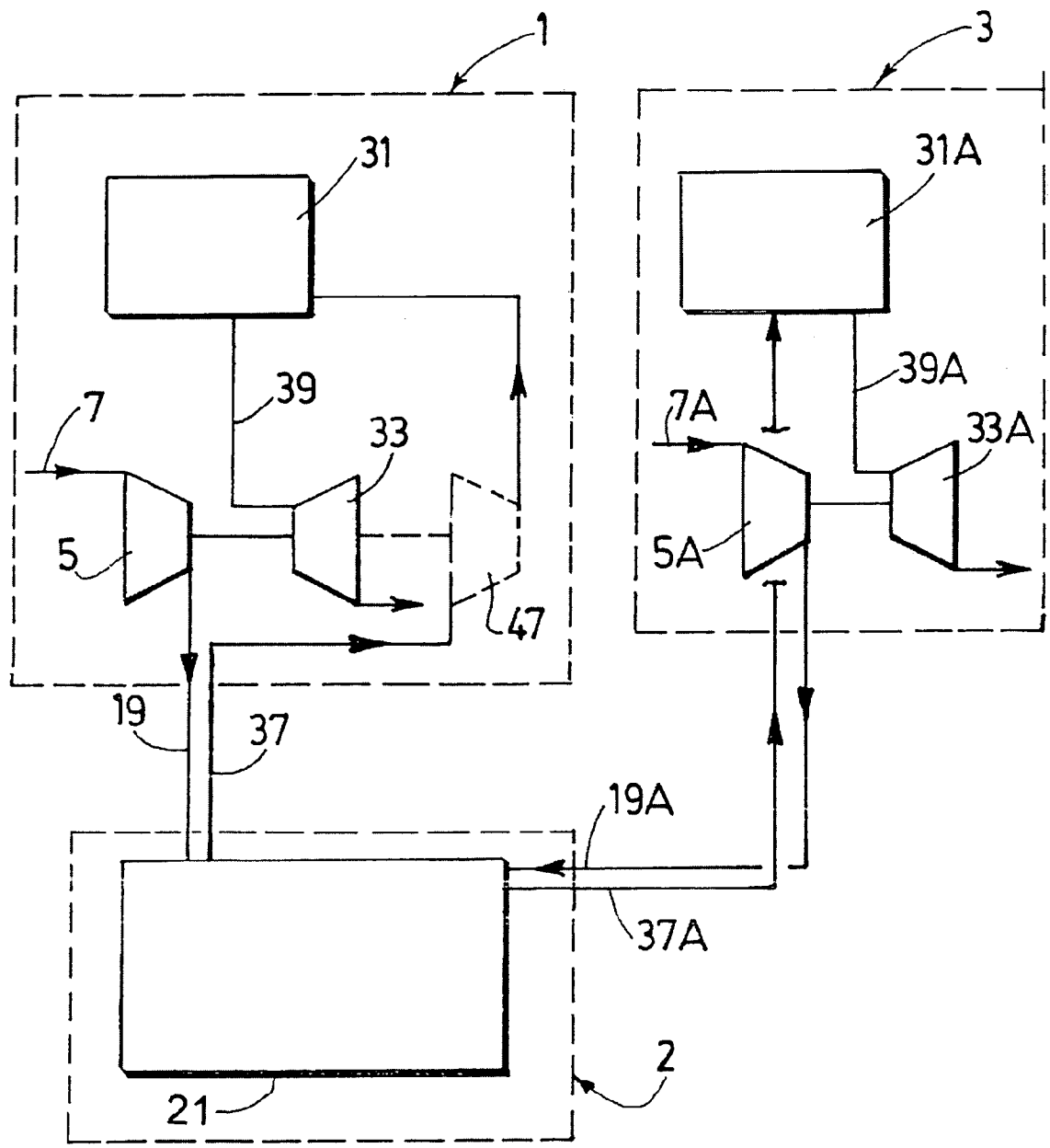
FIG. 2 illustrates an air separation unit integrated with two integrated processes.

FIG. 2 shows an air separation unit 21 integrated with two integrated processes. The first process unit 31 is as described above with reference to FIG. 1. The further process unit 31A is located at a third site 3 at least 1 km from the second site where the air separation unit 3 is located and preferably at least 1 km from the first site. However the further unit 31A may be adjacent to the first site.

The further process unit 31A may operate according to the same process as the first unit 31 or according to a different process.

The unit 31A produces steam or another hot gas 39A, which is expanded in turbine 33A. Gases 39 and 39A may both be steam but the gas 39A may be steam having the same or different properties, e.g. the same or a different pressure as the gas 39 and/or the same or a different temperature as the gas 39.

Air compressor 5A driven by turbine 33A supplies air 19A only to the air separation unit 25 via pipeline. The air compressed by compressor 5A is compressed to a pressure above 8 bars, preferably above 12 bars.

Additionally as in FIG. 1 there may a dedicated air compressor at the second site 2.

Preferably the pipelines 19, 19A, and by compressors 5 and 5A supply the air to the second site 2 at substantially the same pressure so that a single purification unit within the air separation unit 21 is necessary. This may mean that the compressors 5 and 5A compress the air to substantially the same pressure if the pressure losses within the pipelines are substantially the same Alternatively the compressors 5 and 5A may compress the air to different pressures but the air arrives at the air separation unit at substantially the same pressure from both pipelines due to a judicious choice of the pipeline diameters and/or lengths and/or the use of an expansion means, such as a valve.

If several purification means are provided, the air supplied by the compressors 5 and 5A may arrive at the second site at different pressures (due to different pressures at the compressor outlets and/or different pressure drops within the pipeline systems). In this case, the air pressures may be chosen or modified at the second site to correspond to pressures of different columns of the air separation unit. For example, one air stream may be purified at the pressure of the high pressure column of the air separation unit whilst another air stream may be purified at the pressure of an intermediate or low pressure column of the air separation unit.

A product gas 37A coming from the air separation unit is also sent to another pipeline running substantially parallel to the air pipeline for air 19A over at least part of its length. This gas, which may be nitrogen, oxygen or argon, is unpressurized, partly pressurized or pressurized. Where the gas is unpressurized or partly pressurized, it may be compressed in a compressor coupled to the turbine 33A at the third site. The gas may then be used at the third site, for example in the process or another process.

Alternatively, the pipeline for air 19A may run substantially parallel to the pipeline for air 19 over at least a part of its length or may feed into that pipeline 19 (or vice versa depending on where the sites 1, 2, 3 are).

Similarly the pipeline for gas 37A may run substantially parallel to the pipeline for gas 37 over at least a part of its length or may feed into that pipeline 37 (or vice versa depending on where the sites are) if the gases have substantially the same purity or can be mixed to form a mixture having a required composition.

At least one fluid produced by the air separation unit may be sent to the first or third site or both.

The third site 3 may be contiguous with the second site 2, less than 1 km from the second site or at least 1 km from the second site and/or the third site 3 may be contiguous with the first site 1, less than 1 km from the first site or at least 1 km from the first site.

The air separation unit may be of any known type. Ideally there should be no air compressor 25 located at the second site to produce air for the air separation unit. All the feed air should come from other sites. One example of an air separation process well suited to this application is that of FIG. 1 of EP-A-0504029 where all the air is compressed to a high pressure using a single compressor.

It will be appreciated that a first stream of air may be compressed using work from a first expansion step (such as a steam turbine expansion) and a second stream of air may be compressed using work from a second expansion step (such as a gas turbine expansion), the first and second air streams may be mixed, possibly after pressure equalisation and sent from the first site to the second site.

Figure 3:
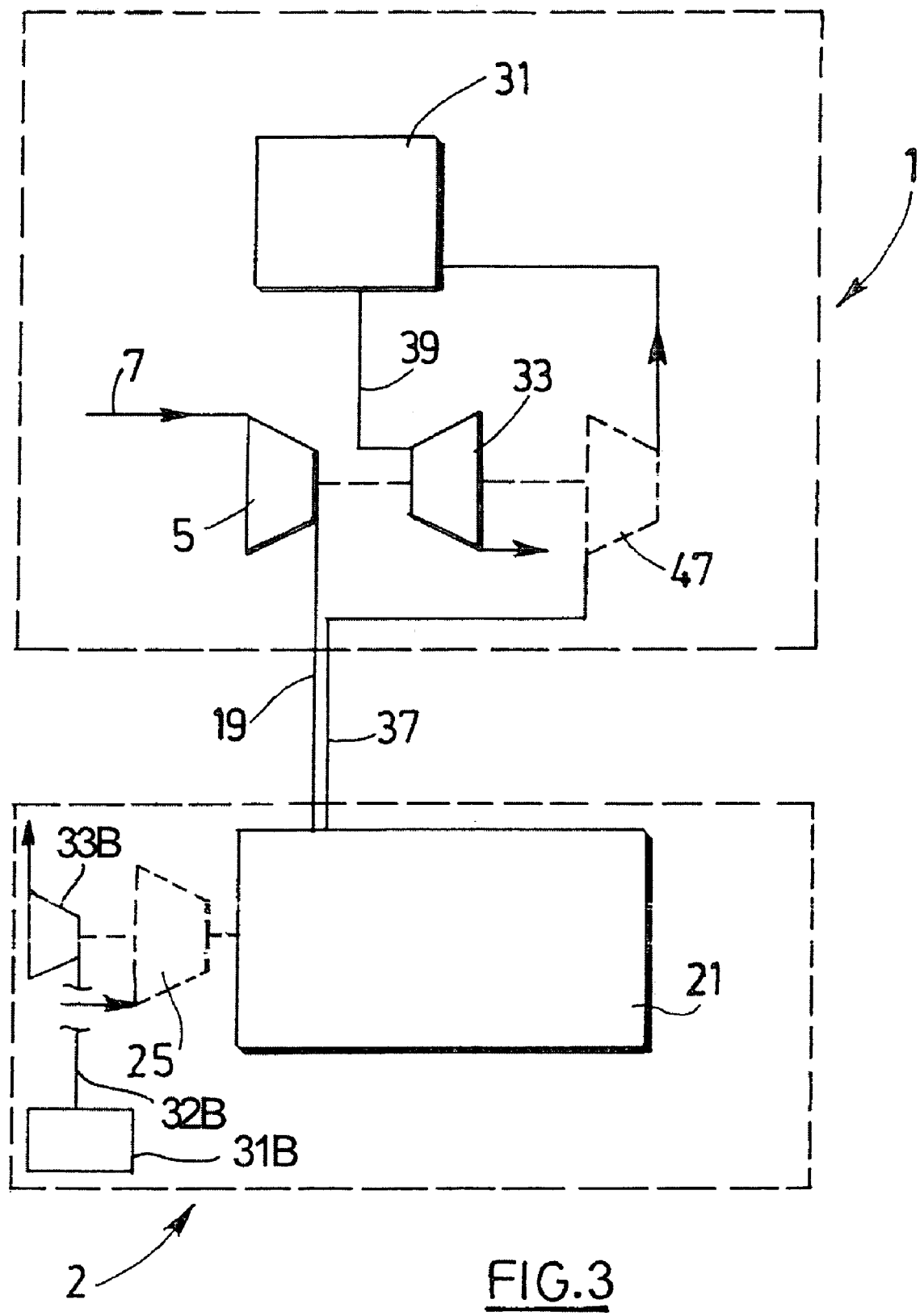
FIG. 3 illustrates another embodiment of an integrated process and air separation unit.

FIG. 3 shows an integrated process and air separation unit.

The integrated process unit 31 is located at a first site 1 and may for example be a GTL unit, for example comprising a Fischer Tropsch unit, a methanol production unit, a DME production unit, a fuel combustion unit such as a gas turbine or any unit producing directly or indirectly steam or another hot gas.

The term "process unit" implies that a process takes place at some location and at some time within the unit. However the unit itself does not necessarily operate according to a process, which is globally exothermic.

The steam or other hot gas 39 is expanded in a turbine 33 (which may form part of process unit 31) located at the first site 1 and work from the turbine is transferred via coupling to an air compressor 5. In this example, the air compressor 5 compresses only air 7 to be sent to the air separation unit 21. The compressed air 19 is compressed to a pressure above 8 bars, preferably above 12 bars and is sent to the air separation unit 21 at a second site 2 at least 1 km away. It is nevertheless conceivable that compressed air from the air compressor 5 could be sent elsewhere, for example to another air separation unit.

Compressed air is sent to the air separation unit 21 from an air compressor 25 located at the second site 2. The air compressor 25 is driven by a turbine 33B, which expands gas from a process unit 31B at the second site. Air to be separated in the air separation unit 21 is purified in a purification unit at the second site and all the air streams sent to the air separation unit 21 at the second site from the purification unit at the second site are at pressures less than 50 bars.

A product gas 37 (which may be replaced by a product liquid) coming from the air separation unit is also sent to another pipeline running at least substantially parallel to the air pipeline over at least part of its length, thereby saving civil engineering costs. This gas, which may be nitrogen, oxygen or argon, is unpressurized, partly pressurized or pressurized. Where the gas is unpressurized or partly pressurized, it may be compressed in a compressor 47 coupled to the turbine 33 at the first site. The gas may then be used at the first site and may for example be used in the process.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An integrated process and air separation process including the steps of:

i) a first expansion step of work expanding at least one first pressurized gas derived from at least one first process at a first site,
ii) using work generated by the expansion of the at least one pressurized gas to drive at least a first air compressor at the first site and removing compressed air from the first air compressor to produce a first compressed air stream;
iii) a second expansion step of work expanding at least one pressurized gas derived from at least one first process at a first site,;
iv) using work generated by the expansion of the at least one pressurized gas to drive at least a first air compressor at the first site and removing compressed air from the first air compressor to produce a second compressed air stream,
v) said first and second compressed air streams are mixed at the first site to produce a single compressed air stream;
vi) sending at least part of the single compressed air stream to an air separation unit, located at a second site remote by at least 1 km from the first site;
vii) separating air in the air separation unit and removing at least one fluid enriched in a component of air from the air separation unit; and
viii) sending at least part of the fluid enriched in a component of air to the first site.

2. An integrated process and air separation process including the steps of:
i) work expanding at least one first pressurized gas derived from at least one first process at a first site;
ii) using work generated by the expansion of the at least one pressurized gas to drive at least a first air compressor at the first site and removing compressed air from the first air compressor;
iii) sending at least part of the compressed air from the first air compressor to an air separation unit, located at a second site remote by at least 1 km from the first site;
iv) separating air in the air separation unit and removing at least one fluid enriched in a component of air from the air separation unit; and
v) sending at least part of the fluid enriched in a component of air to the first site,
further comprising:
vi) Work expanding a further pressurized gas derived from a further process at a third site;
vii) Using work generated by the expansion of the pressurized gas to drive a further air compressor at the third site and removing compressed air from the further air compressor; and
viii) Sending at least part of the compressed air from the further air compressor to the air separation unit, located at the second site remote from the first site.

3. The process of claim 2 wherein the second site is remote from the first and third sites.

4. The process of claim 2 comprising sending a fluid enriched in a component of air from the air separation unit at the second site to the third site.

5. The processes of claim 2 wherein the first pressurized gas and the further pressurized gas have the same principal components.

6. The processes of claim 5 wherein the first pressurized gas and the further pressurized gas have different pressures and/or temperatures.

7. The process of claim 2 wherein the first pressurized gas and the further pressurized gas have different principal components.

8. The process of claim 7 wherein the first pressurized gas and the further pressurized gas have different pressures and/or temperatures.

9. The process of claim 2 combined with at least first and further processes comprising the steps of:
i) removing at least one of oxygen enriched fluid and nitrogen enriched fluid from the air separation unit;
ii) sending at least one of oxygen enriched fluid and nitrogen enriched fluid from the air separation unit to at least one of the first process carried out at the first site and the further process carried out at the third site;
iii) deriving a gas from the first and further processes;
iv) expanding at least part of the gas from the first process in a first turbine producing work;
v) expanding at least part of the gas from the further process in a further turbine producing work;
vii) using at least part of the work produced by the first turbine to compress air in a first air compressor located at the first site to produce compressed air for the air separation unit located at the second site; and
vii) using at least part of the work produced by the further turbine to compress air in a further air compressor located at the third site to produce compressed air for the air separation unit located at the second site.

10. The process of claim 5 wherein the gas derived from the first and further processes is steam.

11. An integrated process and air separation process including the steps of:
i) work expanding at least one first pressurized gas derived from at least one first process at a first site;
ii) using work generated by the expansion of the at least one pressurized gas to drive at least a first air compressor at the first site and removing compressed air from the first air compressor;
iii) sending at least part of the compressed air from the first air compressor to an air separation unit, located at a second site remote by at least 1 km from the first site;
iv) separating air in the air separation unit and removing at least one fluid enriched in a component of air from the air separation unit; and
v) sending at least part of the fluid enriched in a component of air to the first site,
wherein compressed air is sent from a second compressor at the second site to an air separation unit located at the second site.

12. An integrated process and air separation process including the steps of:
i) work expanding at least one first pressurized gas derived from at least one first process at a first site;
ii) using work generated by the expansion of the at least one pressurized gas to drive at least a first air compressor at the first site and removing compressed air from the first air compressor;
iii) sending at least part of the compressed air from the first air compressor to an air separation unit, located at a second site remote by at least 1 km from the first site;
iv) separating air in the air separation unit and removing at least one fluid enriched in a component of air from the air separation unit; and
v) sending at least part of the fluid enriched in a component of air to the first site,
comprising work expanding at least one pressurized gas derived from at least one process at the second site, using work generated by the expansion of the at least one pressurized gas to drive at least an air compressor at the second site and removing compressed air from the air compressor at the second site and sending at least part of the compressed air from the air compressor at the second site to an air separation unit, located at the second site.

13. Combined installation for producing a fluid enriched in a component of air by separation of air and for carrying out a process comprising:
  i) a first process unit located at the first site;
  ii) a first turbine located at the first site coupled at least to a first air compressor located at the first site and means for sending a gas derived from the first process unit to the turbine;
  iii) an air separation unit located at a second site, at least 1 km from the first site;
  iv) a pipeline for sending air from the first air compressor located at the first site to the air separation unit; and
  v) a pipeline for sending a fluid enriched in a component of air from the air separation unit to the first site, comprising a third site and, located at the third site, a further turbine for work expanding a further pressurized gas derived from a further process at a third site and a further air compressor and a further pipeline for sending at least part of the compressed air from the further air compressor to the air separation unit, located at the second site remote from the first and third sites.

* * * * *

UNITED STATES PATENT AND TRADEMARK OFFICE
CERTIFICATE OF CORRECTION

PATENT NO. : 7,197,894 B2 Page 1 of 1
APPLICATION NO. : 10/778572
DATED : April 3, 2007
INVENTOR(S) : Alain Guillard, Patrick Le Bot and Bernard Saulnier It is certified that error appears in the above-identified patent and that said Letters Patent is hereby corrected as shown below:

In Column 6, line 25 claim 10, replace the words "claim 5" with --claim 9--.

Signed and Sealed this

Fifteenth Day of May, 2007

JON W. DUDAS
*Director of the United States Patent and Trademark Office*